(12) United States Patent
Kulkarni

(10) Patent No.: US 9,433,888 B2
(45) Date of Patent: Sep. 6, 2016

(54) THREE STAGE MEMBRANE SEPARATION WITH PARTIAL REFLUX

(71) Applicant: L'Air Liquide, Societe Anonyme pour l'Etude et l'Exploitation des Procedes Georges Claude, Paris (FR)

(72) Inventor: Sudhir S. Kulkarni, Wilmington, DE (US)

(73) Assignee: L'Air Liquide Société Anonyme Pour L'Étude Et L'Exploitation Des Procedes Georges Claude, Paris (FR)

( * ) Notice: Subject to any disclaimer, the term of this patent is extended or adjusted under 35 U.S.C. 154(b) by 0 days.

(21) Appl. No.: 14/584,465

(22) Filed: Dec. 29, 2014

(65) Prior Publication Data
US 2016/0184769 A1    Jun. 30, 2016

(51) Int. Cl.
*B01D 53/22* (2006.01)
*C01B 23/00* (2006.01)

(52) U.S. Cl.
CPC ......... *B01D 53/226* (2013.01); *C01B 23/0042* (2013.01); *B01D 2317/02* (2013.01); *B01D 2317/022* (2013.01); *B01D 2317/025* (2013.01); *C01B 2210/001* (2013.01);
(Continued)

(58) Field of Classification Search
CPC ............ B01D 53/226; B01D 2317/02; B01D 2317/022; B01D 2317/025; C01B 23/0042; C01B 2210/001; C01B 2210/0028; C01B 2210/0031; C01B 2210/0032; C01B 2210/004
USPC .................................................. 95/53; 96/9
See application file for complete search history.

(56) References Cited

U.S. PATENT DOCUMENTS 3,350,844 A    11/1967  Robb
4,119,417 A    10/1978  Heki et al.
(Continued)

FOREIGN PATENT DOCUMENTS

EP    0 110 858       6/1984
RU       111423 U1    3/2012
(Continued)

OTHER PUBLICATIONS

Agarwal, et al., "Gas separation membrane cascades. II. Two-compressor cascades", Journal of Membrane Science 112, 1996, pp. 129-146.
(Continued)

*Primary Examiner* — Jason M Greene
(74) *Attorney, Agent, or Firm* — Christoper J. Cronin

(57) ABSTRACT

A first gas present at low concentration in a source gas is recovered from the source gas (comprising a fast first gas and a slow second gas) at a relatively high recovery using a particular scheme of three gas separation membrane stages. The non-permeate from the first stage is a product gas comprising the slow gas. The second stage feeds non-permeate to the third stage. The third stage non-permeate is combined with the gas fed to the first stage. The permeate from the second stage is divided into two portions. The second portion is a product gas comprising the fast gas. The first portion is combined with the permeates from the first and third stages and the combination is compressed and fed to the second stage. The invention is particularly applicable for separation of Helium from natural gas.

6 Claims, 1 Drawing Sheet

(52) U.S. Cl.
CPC ..... *C01B 2210/004* (2013.01); *C01B 2210/0028* (2013.01); *C01B 2210/0031* (2013.01); *C01B 2210/0032* (2013.01)

(56) References Cited

U.S. PATENT DOCUMENTS

| | | | | |
|---|---|---|---|---|
| 4,264,338 | A * | 4/1981 | Null | B01D 53/226 96/9 |
| 5,064,446 | A * | 11/1991 | Kusuki | B01D 53/226 95/53 |
| 5,256,295 | A | 10/1993 | Baker et al. | |
| 6,458,190 | B2 * | 10/2002 | Dolle | B01D 53/227 96/9 |
| 6,986,802 | B2 * | 1/2006 | Colling | B01D 53/225 96/9 |
| 7,604,681 | B2 | 10/2009 | Malsam et al. | |
| 8,617,292 | B2 | 12/2013 | Hasse et al. | |
| 2007/0272079 | A1 * | 11/2007 | Malsam | B01D 53/226 96/7 |
| 2010/0101410 | A1 * | 4/2010 | Prasad | C01B 3/0015 95/53 |
| 2010/0288701 | A1 * | 11/2010 | Zhou | B01D 53/228 96/9 |
| 2010/0313750 | A1 * | 12/2010 | Sanders, Jr. | B01D 53/226 95/53 |
| 2011/0041687 | A1 * | 2/2011 | Diaz | B01D 53/225 95/49 |
| 2014/0243574 | A1 * | 8/2014 | Karode | C01B 23/0047 95/53 |
| 2014/0262989 | A1 | 9/2014 | Pimentel et al. | |
| 2014/0345457 | A1 * | 11/2014 | Balster | B01D 53/226 95/53 |

FOREIGN PATENT DOCUMENTS

| | | |
|---|---|---|
| WO | WO2009/087520 A1 | 7/2009 |
| WO | WO 2012/050816 | 4/2012 |
| WO | WO2012/050816 A2 | 4/2012 |
| WO | WO2012/067545 A1 | 5/2012 |

OTHER PUBLICATIONS

Hao, et al., "Upgrading low-quality natural gas with H2S- and CO2-selective polymer membranes. Part II. Process design, economics, and sensitivity study of membrane stages with recycle streams", Journal of Membrane Science, 320, 2008, pp. 108-122.

Tsuru, et al., "Permeators and continuous membrane columns with retentate recycle", Journal of Membrane Science, 98, 1995, pp. 57-67.

Seok, et al.,"Separation of helium and hydrocarbon mixtures by a two-membrane column", Journal of Membrane Science, 27 (1986) pp. 1-11.

International Search Report and Written Opinion for PCT/US2015/067448, mailed Mar. 14, 2016.

* cited by examiner

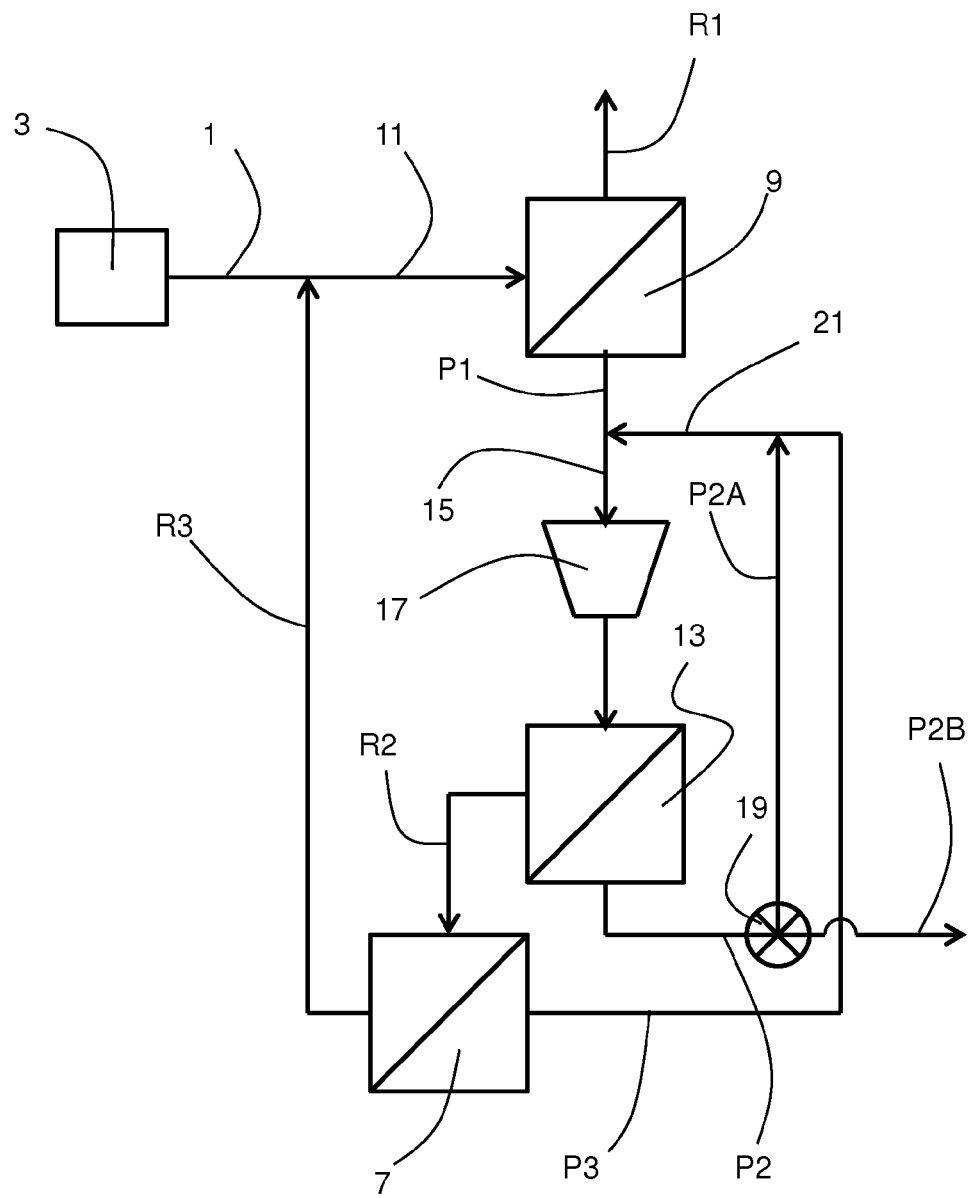

THREE STAGE MEMBRANE SEPARATION WITH PARTIAL REFLUX

CROSS-REFERENCE TO RELATED APPLICATIONS

None.

BACKGROUND

1. Field of the Invention

The present invention relates to membrane separation at relatively high recovery of a gas that is present in a gas mixture at a relatively low concentration. More particularly, the present invention relates to membrane separation at relatively high recovery of Helium that is present in natural gas at a relatively low concentration.

2. Related Art

For relatively rare and/or costly gases, it is often desirable to recover them from natural or industrial sources where such gases are in admixture with other gases. A variety of separation technologies exist for separation of rare and/or costly gases from gas mixtures, including adsorption, such as pressure swing adsorption (PSA), and cryogenic distillation.

One separation technology, gas separation membranes, typically includes one or more compressors and one or more gas separation membranes arranged in parallel or series. A permeate is obtained on a side of the membrane opposite the side to which the feed gas is fed. The separation layer of the membrane preferentially permeates one gas or gases in comparison to another gas or gases so that the permeate becomes enriched in one or more components. The non-permeate is obtained from the same side of the membrane from which the feed gas is fed and consequently is deficient in the component or components of which the permeate is enriched. Selection of the particular material making up the separation layer is driven by which components in the feed gas are desired for enrichment in the permeate and which components in the feed gas are desired for enrichment in the non-permeate. While there are a wide variety of materials used in gas separation membranes, one type of commonly used material is glassy polymers.

One gas of particular interest for recovery is Helium which is only available at significantly high volumes from natural gas. Helium is typically present in natural gas at below 0.5 mol % levels and is mostly extracted as crude Helium across liquid natural gas (LNG) trains. This crude Helium, containing about 20-30 mol % Helium, is then enriched either by cryogenic distillation or via a PSA to make 99.9999 mol % Helium.

Small gas molecules such as Helium are well known to be more permeable through glassy polymer membranes than methane or $N_2$. Hence, membranes can be considered for Helium recovery from natural gas. However, Helium is typically found in very low concentrations and it is difficult for a single stage membrane to achieve commercially viable levels of recovery and/or selectivity. High Helium purity is desired because it reduces the cost of further processing and it limits the loss of the slower permeating natural gas In general, recovery of dilute components by membranes requires multiple stages in order to achieve high purity. Other mass transfer operations, such as distillation can produce high purities by means of multiple stages. Unfortunately, membrane processes are expensive to stage since each additional stage often involves permeate recompression with the attendant operating and capital costs of the compressor. In other words, the permeate from the first stage typically must be compressed to a satisfactory pressure for separation in the second stage and the permeate from the second stage similarly may need to be compressed before it is fed to the third stage. Each additional compressor increases the capital, and especially operating, expense of such a multi-stage scheme.

Methods of optimally staging membrane processes have been extensively studied in the academic literature in an effort to reach a desired recovery and/or purity. Examples of this work include Agarwal, et al., ("Gas separation membrane cascades II. Two-compressor cascades", Journal of Membrane Science 112 (1996) 129-146) and Hao 2008 ("Upgrading low-quality natural gas with $H_2S$— and $CO_2$-selective polymer membranes Part II. Process design, economics, and sensitivity study of membrane stages with recycle streams", Journal of Membrane Science 320 (2008) 108-122).

Staged membrane operations are also practiced commercially.

A prior art 2-stage configuration for He recovery is described in RU114423U where high pressure natural gas with a relatively small He content is fed to the feed side of the $1^{st}$ stage membrane. The $1^{st}$ stage membrane permeate (enriched in He) is re-compressed and fed to the feed side of the $2^{nd}$ stage membrane. The permeate from the $2^{nd}$ stage is further enriched in He and constitutes the product which may be re-compressed for further purification or usage. While this is a relatively simple configuration to operate, this configuration is limited in the final product He purity.

Higher He product purity can be achieved through a cascade of membrane stages. For example, by adding a $3^{rd}$ stage which is fed by re-compressing the $2^{nd}$ stage permeate, the product He purity can be further enhanced. In practice, such schemes are rarely used because of their added complexity and additional compressor cost. A pseudo-3-stage operation that does not require an additional compressor stage is taught in U.S. Pat. No. 7,604,681. However, the lower pressure ratio across the $2^{nd}$ and $3^{rd}$ membrane stages causes lower separation factors across these stages. With high selectivity membranes, such a scheme becomes pressure ratio limited and product He purity is reduced.

Permeate refluxing is described in some versions of membrane column work by Tsuru, et al. ("Permeators and continuous membrane columns with retentate recycle", Journal of Membrane Science 98 (1995) 57-67). In this context, permeate refluxing is practiced on a single membrane stage with refluxing of a fraction of the permeate, then re-compressing that fraction and recycling it to either the feed gas or as a sweep gas. This permeate refluxing scheme is not appropriate for handling a high volume gas as the membrane area required for combined high purity and high recovery is very high.

A configuration incorporating a permeate recycle suitable for fast gas purification is described in the 2-stage process described by WO 12050816 A2. In this scheme, permeate from a first membrane stage (or from a section of a first membrane stage) is re-compressed and processed by a second stage consisting of 2 membrane banks in series. The second stage permeate is achieved at higher fast gas purity. In this scheme, the series stages serve as an overall second stage permeate reflux with permeate from the first in the series constituting the fast gas enriched product while permeate from second in the series is recycled to increase the fast gas concentration entering the second stage. The higher purity permeate from first in the two stages in series is the fast gas enriched product. The lower purity permeate from the second of the two stages in series is recycled to the suction of the compressor feeding the second membrane stage. The second stage non-permeate is recycled to the first stage membrane feed. Higher fast gas product purity from the first in the series can be achieved by reducing the membrane area in the first of the series relative to second of the series. However, in practice, the membrane area in the first of the series cannot be reduced markedly without incurring a high feed to non-permeate pressure drop. Such a high pressure drop is a parasitic energy loss, and with conventional membrane design, can pose a threat to the mechanical integrity of the membrane. The relative permeate rates from first in the series versus the second in the series are also difficult to adjust without extensive and complex plumbing. Thus, the relative rates would in practice be fixed and cannot be easily manipulated in order to adjust for varying feed concentrations, pressures or membrane performance changes.

It is therefore an object of the invention to provide a method and system for membrane-based gas separation to obtain a satisfactorily high recovery of a first gas at a satisfactorily high purity from a source gas that includes a minor amount of the first gas and a majority of a second without sacrificing too much of the second gas. It is also an object of the invention to provide a method and system for membrane-based gas separation to obtain a satisfactorily high recovery of the first gas at a satisfactorily high purity from the source gas without requiring an undesirably high gas separation membrane surface area. It is also an object of the invention to provide a method and system for membrane-based gas separation of first and second gases without a parasitic energy loss. It is also an object of the invention to provide a method and system for membrane-based gas separation of first and second gases that can be easily adjusted in view of varying feed concentrations, pressures, or membrane performance changes.

SUMMARY

There is disclosed a method of recovering a first gas from a source gas comprising a minor amount of the first gas and an amount of a second gas at a higher concentration than that of the first gas. The method comprises the following steps. A first gas mixture is separated with a first gas separation membrane into a first permeate and a first non-permeate. A second gas mixture is separated with a second gas separation membrane into a second permeate and a second non-permeate. The second non-permeate is separated with a third gas separation membrane into a third permeate and a third non-permeate. Each of the first, second, and third gas separation membranes includes a separating layer that is more permeable to the first gas than to the second gas. The third non-permeate is combined with a flow of gas from the source gas to provide the first gas mixture. The second permeate is divided into first and second portions, the second portion being a first product gas comprising the first gas. The first non-permeate is a second product gas comprising the second gas. The first portion and the third permeate are combined with the first permeate and their combination is compressed with a compressor to provide the second gas mixture.

The method may include one or more of the following aspects:
- the source gas is He-containing natural gas, the first gas is Helium, and the second gas comprises $CH_4$, He being present at a concentration of less than 0.5 mol %.
- a purity of the first gas in the first product gas is controlled by adjusting the allocation of the second permeate into the first and second portions with a valve assembly in a line receiving the second permeate.
- a ratio of the mass flow rate of the first portion to the second portion ranges from 1:4 to 4:1.
- $PG^{2nd}_{flow}$=a mass flow rate of the second product gas.
- $PG^{2nd}_{purity}$=a concentration of the second gas in the second product gas.
- $Source_{flow}$=a mass flow rate of the flow of the source gas.
- $Source_{purity}$=a concentration of the second gas in the source gas.
- a % recovery of the second gas is provided by the formula:

$$\text{recovery} = (PG^{2nd}_{flow} \times PG^{2nd}_{purity}) / (Source_{flow} \times Source_{purity}).$$

- the % recovery of the second gas is controlled by adjusting the allocation of the second permeate into the first and second portions with a valve assembly in a line receiving the second permeate.
- the source gas is a vent gas from an air separation process; the first gas is He, Ne, or a mixture of He and Ne; and the second gas comprises a mixture of $N_2$ and $O_2$.
- the source gas is a cooling gas from an optical fiber cooling tower; the first gas is He; and the second gas is a mixture of $N_2$ and $O_2$.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein:

The FIGURE is a schematic view of the method and system for separating a first gas from a second gas from a gas source (containing the first and second gases) using three gas separation membrane stages utilizing a partial reflux from the second stage.

DESCRIPTION OF PREFERRED EMBODIMENTS

In the method and system according to the invention, first and second product gases made up of predominantly first and second gases, respectively, are obtained from a source gas. The source gas contains mostly a majority of the second gas and also includes the first gas at a relatively low concentration. The second gas can be a single gas or a mixture of two or more gases, such as the air gases $O_2$ and $N_2$. A particular gas membrane separation scheme allows the first product gas to be obtained at a relatively high recovery and purity and the second product gas to be obtained at a satisfactory recovery.

As best illustrated by the FIGURE, a feed gas 1 is obtained from a source 3. The feed gas 1 is combined with a non-permeate R3 from a third stage membrane 7 and fed to a first stage gas separation membrane 9. The gas mixture 11 formed from the combination of the feed gas 1 and the non-permeate R3 is separated by the first stage membrane 9 into a first permeate P1 and a first non-permeate R1. The polymeric material making up the separation layer of the first stage membrane 9 is selected such that it is more permeable to the first gas than to the second gas. Under such conditions, the first gas is considered the "fast" gas and the second gas the "slow gas". When the second gas is present in the first non-permeate R1 at a satisfactorily high enough concentration, the first non-permeate R1 may be recovered as a product gas, a majority of which is the second gas.

The source comprises first and second gases with the first gas being present at a relatively low concentration and the second gas at a relatively high concentration. While the source is not limited to a particular combination of first and second gas, the first gas must be present in the source at a significantly lower concentration than that of the second gas. Typically, the source includes <5 vol % and more typically <1 vol % of the first gas with balance being the second gas. A non-limiting example of gas sources and paired first and second gases includes natural gas containing a minor amount of He (fast gas) and majority of $CH_4$ and $C_{2-4}$ hydrocarbons (slow gases). Another example is vent gases from an air separation process that contains He and/or Ne (fast gases) and the air gases $N_2$ and $O_2$ (slow gases). Yet another example is cooling gas from an optical fiber cooling tower containing He (fast gas) and the air gases $N_2$ and $O_2$ (slow gases). Typically, the source is He-containing natural gas that includes no more than 0.5% Helium.

The first permeate P1 is combined with a portion P2A of the permeate P2 from a second stage membrane 13 and all the permeate P3 from a third stage membrane 7. The combination of portion P2A and permeate P3 may be considered to be a reflux stream 21. The gas stream 15 (formed from the combination of the first permeate P1 with the portion P2A of the permeate P2 from the second stage membrane 13 and all the permeate P3 from the third stage membrane 7) are compressed at a compressor 17 and fed to the second stage membrane 13. Similar to the first stage membrane 9, the polymeric material making up the separation layer of the second stage membrane 13 is selected such that it is more permeable to the first gas than the second gas. Typically, a same polymeric material is used in the separation layer of each of the first second and third membrane stages 9, 13, 7.

The second stage membrane 13 separates the compressed gas stream 15 into the second permeate P2 and a second non-permeate R2. A valve assembly 19 is used to divide the second permeate P2 into the first portion P2A and a second P2B. If the second portion P2B contains the first gas at a high enough purity, the second portion P2B can constitute a first product gas. Otherwise, the second portion P2B may be further treated with known gas separation techniques to raise the purity of the first gas so as to provide the first product gas. Similarly, if the first non-permeate R1 contains the second gas at a high enough purity, the first non-permeate R1 can constitute a second product gas. When the source gas is He-containing natural gas, the first product gas is He and the second product gas is natural gas which may be optionally treated with known gas separation techniques for on-site use, compression, transport off-site, or injection into a pipeline as desired.

The second non-permeate R2 is relatively depleted in the first gas and is fed to the third stage membrane 7. The third stage membrane 7 separates the second non-permeate R2 into the third permeate P3 and the third non-permeate R3. Typically the first gas concentration of the third non-permeate R3 is similar to that of feed gas 1 and is combined therewith. Since the third stage membrane 7 receives an overall lower first gas concentration than the second stage membrane 13, the third stage permeate P3 has a lower first gas purity than the second stage permeate P2. A total reflux stream 21 is formed by combining the third permeate P3 with the first portion P2A. As seen in the FIGURE, the reflux stream 21 is mixed with the first stage permeate P1 to form stream 15.

With the foregoing description of the FIGURE in mind, the first stage membrane 9 may be considered to be a first gas stripper because the first gas is stripped from the feed gas 1. Proceeding within this context, the skilled artisan will recognize that the membrane area of the first stage membrane 9 is selected so as to achieve an overall desired recovery of the first gas from the feed gas. Selection of an appropriate membrane area for the first stage membrane 9 is of relatively greater importance than selection of the membrane area for the downstream stage, because the area requirement in the first stage membrane 9 is typically greater than that of the downstream stage. All other factors being constant, a higher membrane area for the first stage membrane 9 will result in higher recovery of the first gas, but a lower purity of the first gas in the first stage permeate P1.

Also, the combination of the second and third stage membranes 13, 7 may be considered to be a first gas enricher because the first gas is enriched in the second and third permeates P2, P3. The total membrane area of the second and third stage membranes 13, 7 is selected so as to reduce the concentration of the first gas in the third permeate P3 to approximately the concentration of the first gas in the feed gas 1.

The ratio of the flow of first portion P2A to the flow of the entirety of the second permeate P2 is defined in this context as the variable reflux ratio $R:R=P2A_{flow}/P2_{flow}$. The total reflux from the combined first portion P2A and third permeate P3 may be set by the pre-determined fixed area distribution between these the second and third stage membranes 13, 7 and the easily varied reflux ratio R. Increasing R will reduce the loss of the second gas in the first product gas P2B (or stated another way, increase the overall recovery of the second gas by the system of the invention) and will also increase the purity of the first gas in the first product gas P2B. When the source gas is He-containing natural gas, increasing R may be used to reduce the loss of natural gas hydrocarbons (BTUs) in the first product gas P2B and increase the overall recovery of natural gas hydrocarbons (BTUs) by the system of the invention. It will also increase the He purity in the first product gas P2B. Admittedly, increasing the reflux ratio may increase the membrane area required for the second stage membrane 13 and 7 and may also increase compression costs incurred by compressor 17. However, these effects are relatively small in comparison to the above-mentioned benefits since the permeate streams P2A, P3 are small compared to the feed gas 1.

The first and second gas separation membranes may be configured in a variety of ways, such as a sheet, tube, or hollow fiber. One of ordinary skill in the art will recognize that the permeate "side" of a membrane does not necessarily mean one and only one side of a membrane. Rather, in the case of membranes made up of a plurality of hollow fibers, the permeate "side" actually is considered to be the plurality of sides of the individual hollow fibers that are opposite to the sides to which the relevant feed gas is introduced. Preferably, each of the gas separation membranes 9, 13, 7 is made up of a plurality of hollow fibers. In that case, the hollow fiber may be monolithic or it may include a sheath separation layer surrounding a core layer.

The material constituting the separation layer of the membranes is driven by the selection of pair of first and second gases sought to be separated. Non-limiting examples of materials suitable for the separation layer in the membrane for a wide variety of gas pairs include polymers or copolymers such as polysulfones, polyether sulfones, polyimides, polyaramides, polyamide-imides, and blends thereof. Many suitable polymeric materials are described in U.S. Pat. No. 8,617,292.

In the case of a source gas of natural gas containing He, a class of particularly suitable polymeric materials is described by WO 2009/087520 and includes the repeating units shown in the following formula (I):

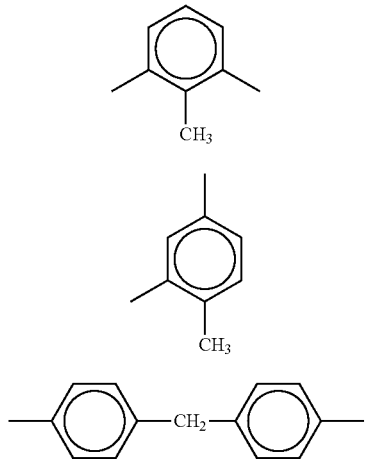

(I)

in which $R_1$ of formula (I) is a moiety having a composition selected from the group consisting of formula (A), formula (B), formula (C), and mixtures thereof, and

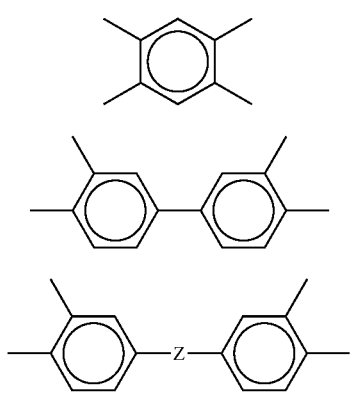

(A)

(B)

(C)

in which $R_4$ of formula (I) is a moiety having a composition selected from the group consisting of formula (Q), formula (S), formula (T) and mixtures thereof,

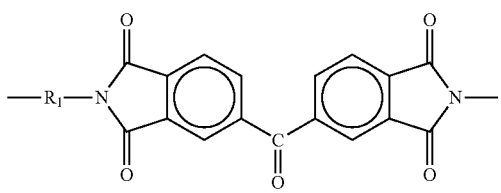

(Q)

(S)

(T)

in which Z of formula (T) is a moiety selected from the group consisting of formula (L), formula (M), formula (N) and mixtures thereof.

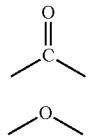

(L)

(M)

(N)

In one embodiment, a polyimide forming the selective layer of the membrane(s) has repeating units as shown in the following formula (Ia):

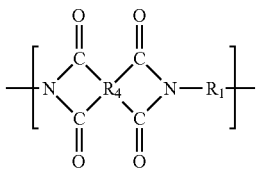

(Ia)

In this embodiment, moiety $R_1$ of formula (Ia) is of formula (A) in 0-100% of the repeating units, of formula (B) in 0-100% of the repeating units, and of formula (C) in a complementary amount totaling 100% of the repeating units. A polymer of this structure is available from HP Polymer GmbH under the trade name P84. P84 is believed to have repeating units according to formula (Ia) in which $R_1$ is formula (A) in about 16% of the repeating units, formula (B) in about 64% of the repeating units and formula (C) in about 20% of the repeating units. P84 is believed to be derived from the condensation reaction of benzophenone tetracarboxylic dianhydride (BTDA, 100 mole %), with a mixture of 2,4-toluene diisocyanate (2,4-TDI, 64 mole %), 2,6-toluene diisocyanate (2,6-TDI, 16 mole %) and 4,4'-methylene-bis (phenylisocyanate) (MDI, 20 mole %).

In another embodiment, the polyimide of the separation layer of the membrane(s) comprises repeating units of formula (Ib):

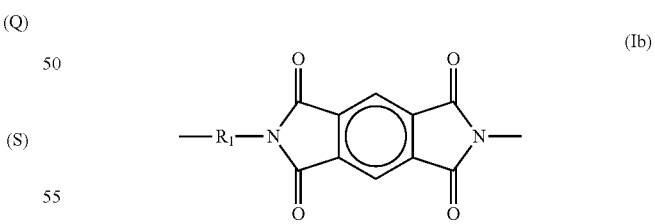

(Ib)

where $R_1$ of formula (Ib) is formula (A) in about 0-100% of the repeating units, and of formula (B) in a complementary amount totaling 100% of the repeating units.

In yet another embodiment, a polyimide in the separation layer of the membrane(s) is a copolymer comprising repeating units of both formula (Ia) and (Ib) in which units of formula (Ib) constitute about 1-99% of the total repeating units of formulas (Ia) and (Ib). A polymer of this structure is available from HP Polymer GmbH under the trade name P84HT. P84HT is believed to have repeating units according to formulas (Ia) and (Ib) in which the moiety $R_1$ is a composition of formula (A) in about 20% of the repeating units and of formula (B) in about 80% of the repeating units, and, in which repeating units of formula (Ib) constitute about 40% of the total of repeating units of formulas (Ia) and (Ib). P84HT is believed to be derived from the condensation reaction of benzophenone tetracarboxylic dianhydride (BTDA, 60 mole %) and pyromellitic dianhydride (PMDA, 40 mole %) with 2,4-toluene diisocyanate (2,4-TDI, 80 mole %) and 2,6-toluene diisocyanate (2,6-TDI, 20 mole %).

EXAMPLES

As described above, one advantage of the partial reflux of from the second membrane stage in the inventive system is that a higher fast gas product purity is very easily achievable using high reflux ratios. This advantage may be seen by simulating the general scheme of WO 2012/050816 (Comparative Example) when used to separate He and natural gas and comparing the simulation results to that of the inventive scheme (Examples) utilizing the same feed gas. It is important to point out that WO 2012/050816 does not disclose the feed gas composition that follows and is in fact directed to separation of $CO_2$ from natural gas instead of He from natural gas. Nevertheless, the general scheme of WO 2012/050816 may serve as a useful tool for comparing the value of the partial reflux of the second stage membrane according to the invention to the absence of such partial reflux.

In each of the Examples and the Comparative Example, the feed gas included 0.55% He, 85% $CH_4$, 4.5% $C_2$ hydrocarbons, and a balance of $C_{3-5}$ hydrocarbons. In each case, the feed gas and the recompressed permeate from the first stage membrane were at a pressure of 60 bar and a temperature of 50° C. All permeate pressures (prior to recompression, if any) were set to 1.5 bar. The simulations were set to target a 90% He recovery.

The first Comparative Example simulated was a three membrane stage process where the non-permeate from the first stage is the hydrocarbon product gas and the permeate from the second stage is the He product gas. The non-permeate from the second membrane stage is fed to the third membrane stage. The permeate from the third membrane stage is combined with the permeate from the first membrane stage and the combination of the two streams is then recompressed and fed to the second membrane stage. The non-permeate from the third membrane stage is combined with the feed gas and the combined streams are fed to the first membrane stage. Therefore, no reflux of the permeate from the second stage membrane is present. In the Comparative Example, the ratio of the membrane surface area of the second stage to that of the third stage was set to 1:1.

The first Example simulated was the three membrane stage process as described above for the invention. The main difference between the scheme of this Example and the Comparative Example is that a portion of the permeate from the second stage membrane is combined with the permeates from the first and third stages (for recompression and feeding to the second stage membrane) and the remainder of the permeate from the second stage membrane constitutes the He product gas. Similar to the Comparative Example, the ratio of the surface area of the second stage to that of the third stage was set to 1:1. In this first Example, R is set to 0.4.

The second Example simulated is the same scheme as for the first Example. The only difference between the two is that, in the second Example, R is set to 0.8. The foregoing values are tabulated in Table I below.

TABLE I

Process conditions for Examples and Comparative Example

|  | Comparative Example | Example 1 | Example 2 |
| --- | --- | --- | --- |
| Relative membrane area | 1.00 | 1.00 | 1.00 |
| He recovery (%) | 90.5 | 90.1 | 89 |
| $2^{nd}$ stage membrane area:$3^{rd}$ stage membrane area | 1:1 | 1:1 | 1:1 |
| R | 0 | 0.4 | 0.8 |
| Product He purity (%) | 32.5 | 40.8 | 56.1 |
| He product/feed | 1.5 | 1.2 | 0.9 |
| Relative compression power | 1.00 | 1.08 | 1.37 |

The simulation results summarized by Table I show the higher He purities and lower natural gas losses by following the present invention at the cost of only relatively modest increase in compression combined with a slight reduction in He recovery with membrane area maintained at the same level.

A further advantage of the inventive scheme is the ability to use R as a process control variable. In the case of natural gas, the relative concentrations of the component gases (especially methane/$C_{2-4}$ hydrocarbons, and He) may vary over time. Also, there may be more frequent diurnal fluctuations in process temperature and pressure. Additionally, membrane aging will also affect the overall process purities. The easily variable reflux ratio R can be used as part of the process control strategy to keep He purity and concomitant natural gas losses within a desired range. While changing the "fixed" membrane surface area ratio (of the second stage membrane to the third stage membrane) is possible with a complex plumbing and valving scheme, such a change cannot be done quickly or cost effectively compared to a remotely controlled single valve operation such as that offered by varying the reflux ratio R.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A method of recovering a first gas from a source gas comprising a minor amount of the first gas and an amount of a second gas at a higher concentration than that of the first gas, said method comprising the steps of: separating a first gas mixture with a first gas separation membrane into a first permeate and a first non-permeate; separating a second gas mixture with a second gas separation membrane into a second permeate and a second non-permeate; and separating the second non-permeate with a third gas separation membrane into a third permeate and a third non-permeate, wherein:

each of the first, second, and third gas separation membranes includes a separating layer that is more permeable to the first gas than to the second gas;

the third non-permeate is combined with a flow of gas from the source gas to provide the first gas mixture;

the second permeate is divided into first and second portions, the second portion being a first product gas comprising the first gas;

the first non-permeate is a second product gas comprising the second gas;

the first portion and the third permeate are combined with the first permeate and their combination is compressed with a compressor to provide the second gas mixture; and a % recovery of the second gas is controlled by adjusting the allocation of the second permeate into the first and second portions with a valve assembly in a line receiving the second permeate.

2. The method of claim 1, wherein the source gas is He-containing natural gas, the first gas is Helium, and the second gas comprises $CH_4$, He being present at a concentration of less than 0.5 mol %.

3. The method of claim 2, wherein:

$PG^{2nd}_{flow}$=a mass flow rate of the second product gas;

$PG^{2nd}_{purity}$=a concentration of the second gas in the second product gas;

$Source_{flow}$=a mass flow rate of the flow of the source gas;

$Source_{purity}$=a concentration of the second gas in the source gas; and the % recovery of the second gas is provided by the formula:

$$recovery = (PG^{2nd}_{flow} \times PG^{2nd}_{purity})/(Source_{flow} \times Source_{purity}).$$

4. The method of claim 1, wherein:

$PG^{2nd}_{flow}$=a mass flow rate of the second product gas;

$PG^{2nd}_{purity}$=a concentration of the second gas in the second product gas;

$Source_{flow}$=a mass flow rate of the flow of the source gas;

$Source_{purity}$=a concentration of the second gas in the source gas;

the % recovery of the second gas is provided by the formula:

$$recovery = (PG^{2nd}_{flow} \times PG^{2nd}_{purity})/(Source_{flow} \times Source_{purity}).$$

5. The method of claim 1, wherein: the source gas is a vent gas from an air separation process; the first gas is He, Ne, or a mixture of He and Ne; and the second gas comprises a mixture of $N_2$ and $O_2$.

6. The method of claim 1, wherein: the source gas is a cooling gas from an optical fiber cooling tower; the first gas is He; and the second gas is a mixture of $N_2$ and $O_2$.

* * * * *